United States Patent
Bray

(10) Patent No.: US 7,988,099 B2
(45) Date of Patent: Aug. 2, 2011

(54) WINGLET

(75) Inventor: Robert M Bray, Bristol (GB)

(73) Assignee: Airbus Operations Limited, Bristol (GB)

( * ) Notice: Subject to any disclaimer, the term of this patent is extended or adjusted under 35 U.S.C. 154(b) by 561 days.

(21) Appl. No.: 10/476,257

(22) PCT Filed: Jun. 12, 2002

(86) PCT No.: PCT/GB02/02720
§ 371 (c)(1),
(2), (4) Date: Oct. 30, 2003

(87) PCT Pub. No.: WO03/000547
PCT Pub. Date: Jan. 3, 2003

(65) Prior Publication Data
US 2004/0155157 A1 Aug. 12, 2004

(30) Foreign Application Priority Data
Jun. 21, 2001 (GB) .................................. 0115130.7

(51) Int. Cl.
*B64C 5/08* (2006.01)
(52) U.S. Cl. ................. 244/199.4; 244/199.1
(58) Field of Classification Search ............ 244/89, 244/90 R, 90 A, 91, 123, 119, 206, 211, 212, 244/51, 199.4
See application file for complete search history.

(56) References Cited

U.S. PATENT DOCUMENTS

| 2,557,829 | A | | 6/1951 | Lavelle |
| 2,697,568 | A | * | 12/1954 | Powers ........................ 244/87 |
| 3,144,220 | A | | 8/1964 | Kittelson |
| 4,455,004 | A | | 6/1984 | Whitaker, Sr. |
| 4,457,479 | A | | 7/1984 | Daude |
| 4,545,552 | A | | 10/1985 | Welles |
| 4,722,499 | A | | 2/1988 | Klug |
| 4,796,192 | A | | 1/1989 | Lewis |
| 5,100,081 | A | * | 3/1992 | Thomas ....................... 244/220 |
| 5,156,358 | A | | 10/1992 | Gerhardt |
| 5,988,563 | A | | 11/1999 | Allen |
| 6,042,059 | A | | 3/2000 | Bilanin et al. |
| 6,484,968 | B2 | * | 11/2002 | Felker ........................... 244/91 |
| 6,578,798 | B1 | * | 6/2003 | Dizdarevic et al. ........... 244/199 |
| 6,673,402 | B2 | * | 1/2004 | Wildenrotter et al. ....... 428/34.5 |

FOREIGN PATENT DOCUMENTS

| GB | 196410 | 4/1923 |
| GB | 390201 | 3/1933 |
| GB | 576125 | 3/1946 |
| GB | 819919 | 9/1959 |

OTHER PUBLICATIONS

Definition of the term "winglet" from www.merriam-webster.com.*
Definition of the term "fixed" from www.merriam-webster.com.*

* cited by examiner

*Primary Examiner* — Benjamin P Lee
(74) *Attorney, Agent, or Firm* — Nixon & Vanderhye P.C.

(57) ABSTRACT

A winglet for an aircraft wing is provided. The winglet has an airflow control arrangement, for example in the form of a trailing edge flap (20) by means of which lift generated by the winglet can be varied. The control arrangement desirably forms part of a manoeuvre load alleviation system (22) for the aircraft.

24 Claims, 4 Drawing Sheets

WINGLET

This application is the US national phase of international application PCT/GB02/02720 filed 12 Jun. 2002 which designated the U.S.

BACKGROUND OF THE INVENTION

1. Field of the Invention

The invention relates to a winglet.

A winglet generally takes the form of an upturned tip on a wing or other flying surface on an aircraft although the term "winglet" may also embrace an end plate which extends both above and below the upper and lower surfaces at the tip of a wing or other flying surface.

2. Discussion of Prior Art

The presence of a winglet serves to increase the efficiency of a wing by reducing drag which would otherwise be induced by wing tip vortices. At the same time, the presence of the winglet increases loading on the wing by virtue of increased lift in the tip region of the wing during flight. The increased lift resulting from the winglet also creates a side force towards the root of the wing which creates an additional bending moment about the root. The consequence of these load increases is that the wing structure has to be made stronger which results in an increase in weight. Therefore whilst increasing efficiency on the one hand, there are, on the other hand, effects which are undesirable and particularly so when the aircraft undergoes high g manoeuvers which is a design load case for some areas of the wing.

SUMMARY OF THE INVENTION

An object of the present invention is to provide a winglet in which the foregoing undesirable effects are reduced whilst still maintaining the advantages of the winglet as far as wing efficiency is concerned.

According to a first aspect of the invention there is provided a winglet for an aircraft wing, the winglet having a control arrangement thereon by means of which lift generated by the winglet can be varied.

By providing the control arrangement, the lift generated can be reduced during manoeuvring so as to reduce the loading which would otherwise be generated on the wing and thereby provide manoeuvre load alleviation (MLA). In the normal cruise condition the control system is not activated and hence the presence of the winglet serves to minimise the effect of wing tip vortices thereby still serving to improve efficiency of the wing.

The control arrangement may be an active control arrangement linked to a control system of the aircraft, for example, as part of a MLA system if present, or it may be a passive control arrangement which would automatically operate in response to a predetermined load condition.

In the active control case, the control arrangement may comprise a control surface and may take the form of any of the following options:—

1. A trailing edge flap in one or more spanwise sections of the winglet.
2. A leading edge flap in one or more spanwise sections of the winglet.
3. A leading edge upper surface trip device which may deploy from within the winglet envelope so as to cause air flow over the upper surface to separate and thereby reduce lift.
4. At least one passage formed in the winglet which extends from the bottom surface to the top surface of the winglet and which can be opened to allow high pressure air at the lower surface to flow upwardly therethrough to the upper surface to reduce lift. The passage may normally be closed by a member which preferably serves as a spoiler when the member is moved to open the passage. Preferably, two such members are provided for closing the passage at the upper and lower surfaces of the winglet.

When the aircraft undergoes a high g manoeuvre, for example 2.5 g, the control arrangement on the winglet may be operable to reduce the lift that it would otherwise generate.

In the passive control case, the control arrangement may comprise any of the following options:—

1. A movable, for example, deformable leading edge which will move in an appropriate sense under a predetermined load to reduce lift.
2. A movable, for example, deformable trailing edge which will move in an appropriate sense under a predetermined load to reduce lift.
3. At least one passage formed in the winglet which extends from the bottom surface to the top surface of the winglet and which is opened by means such as a louvre arrangement at a predetermined load to allow high pressure air at the lower surface to flow upwardly through the passage to the upper surface to reduce lift.
4. A winglet section designed such that the flow breaks down, i.e. separates at a predetermined load condition.

According to a second aspect of the invention there is provided a manoeuvre load alleviation system which includes a winglet according to the first aspect of the invention or any of the subsidiary clauses relating thereto According to a third aspect of the invention there is provided an aircraft wing having winglet according to the first aspect of the invention or any of the subsidiary clauses relating thereto.

According to a fourth aspect of the invention there is provided an aircraft having a wing according to the third aspect of the invention.

BRIEF DESCRIPTION OF THE DRAWINGS

A winglet in accordance with the invention will now be described by way of example with reference to the accompanying drawings in which:—

DETAILED DISCUSSION OF EMBODIMENTS

Figure 1:
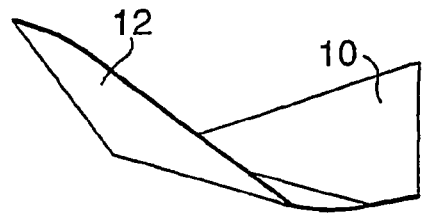
FIG. 1 is a perspective view of a known form of winglet at the tip of an aircraft wing.
Figure 2:
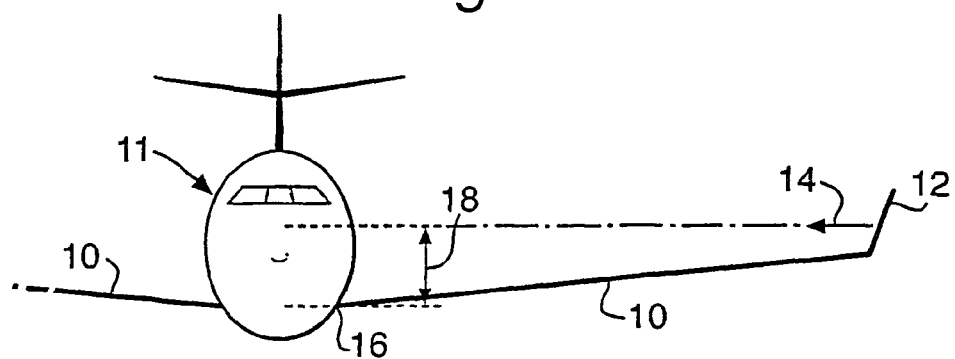
FIG. 2 is a diagrammatic front view of part of an aircraft illustrating the way in which lift at the winglet creates a bending moment at the wing root.
Figure 3:
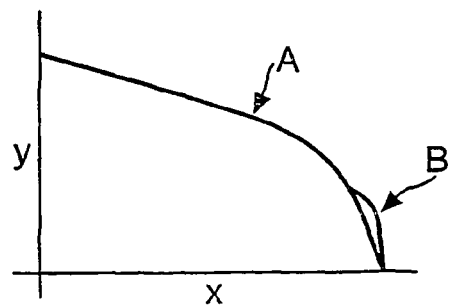
FIG. 3 is a graph showing the way in which the addition of a winglet increases the loading on an aircraft wing, and hence the wing bending moment.

Referring to FIGS. 1 to 3, a wing 10 of an aircraft 11 has a known type of winglet 12 which takes the form of an upturned tip at the outer end of the wing 10. The winglet 12 serves to increase the efficiency of the wing 10 by reducing drag which would otherwise be induced by wing tip vortices during flight.
}

The winglet 12 generates lift in its own right and, as shown in FIG. 2, the lift at the winglet 12 generates an inwardly directed force 14 which creates a bending moment about a root 16 of the wing 10 through an effective moment arm 18. The presence of the winglet 12 also increases the loading on the wing 10 as shown in FIG. 3 and creates an additional bending movement about the wing root. In FIG. 3, axis x represents semi-span of the wing and axis y represents spanwise loading. A curve indicated at A indicates the typical loading of a wing which is not provided with a winglet. The additional curve B represents the additional load on the wing due to the presence of the winglet.

In general, large areas of aircraft wings are designed either by loads generated during a manoeuvre (eg a 2.5 g pull-up) or by fatigue loads, i.e. cyclic loading by uploads in 1 g flight and downloads when the aircraft is on the ground.

The additional of a winglet 12 increases the loads in both of those cases and the winglet of the present invention has as an object to maintain drag savings whilst minimising the additional loads generated by the winglet when the aircraft is in flight. To achieve that object, the present invention provides an airflow control arrangement on the winglet which is primarily intended to reduce the lift generated by the winglet during manoeuvres. Various control arrangements are shown in FIGS. 5 to 11 and will now be described.

Figure 4:
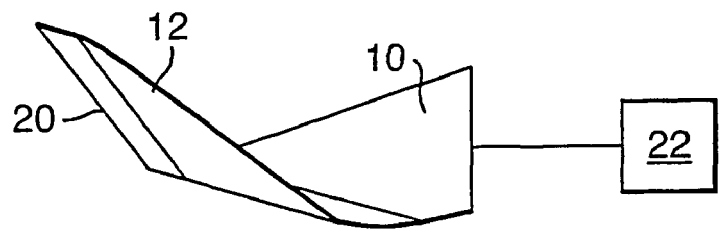
FIG. 4 is a perspective view similar to FIG. 1 showing a winglet in accordance with the present invention.
Figure 5:
FIGS. 5 to 11 are cross-sections taking chordwise through the winglet of FIG. 4 showing various types of airflow control arrangements on the winglet by means of which lift generated by the winglets can be varied.

As shown in FIGS. 4 and 5, a trailing edge flap 20 may be provided in one or more spanwise sections of the winglet 12 (a single section only being shown) and is linked to the normal manoeuvre load alleviation system 22 of the aircraft. During a manoeuvre, the trailing edge flap 20 can be raised as shown in FIG. 5 to reduce the lift on the winglet 12.

Figure 6:
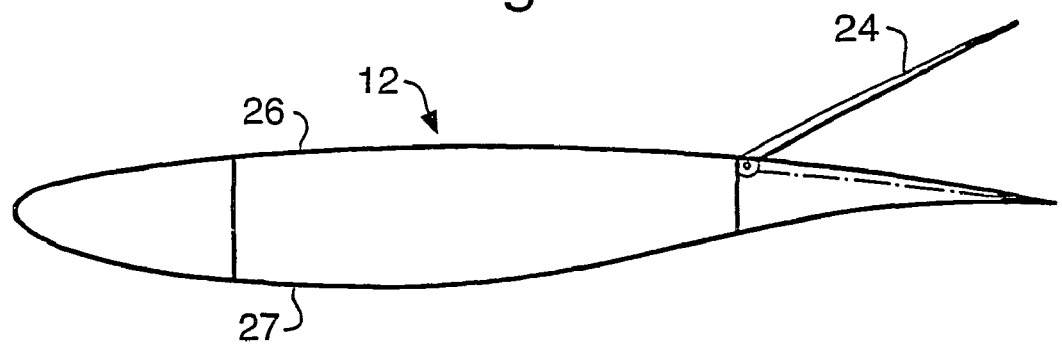

FIG. 6 is a view similar to FIG. 5 but showing a different type of trailing edge device (a spoiler) 24 which can be moved upwardly from a position flush with an upper surface 26 of the winglet 12 to reduce lift. One or more spoilers 24 can be provided in one or more spanwise sections of the winglet 12. The lower surface (indicated at 27) of the winglet 12 remains unaffected by movement of the spoiler 24.

Figure 7:
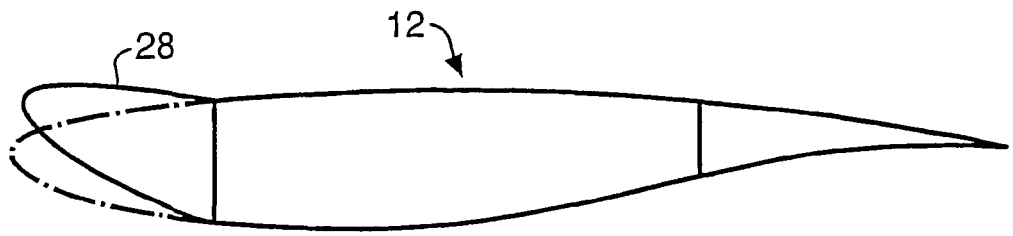

Looking at FIG. 7, a leading edge flap 28 is provided, again linked to the manoeuvre load alleviation system 22 of the aircraft to reduce lift. Flaps 28 can be provided in a plurality of leading edge sections.

Figure 8:
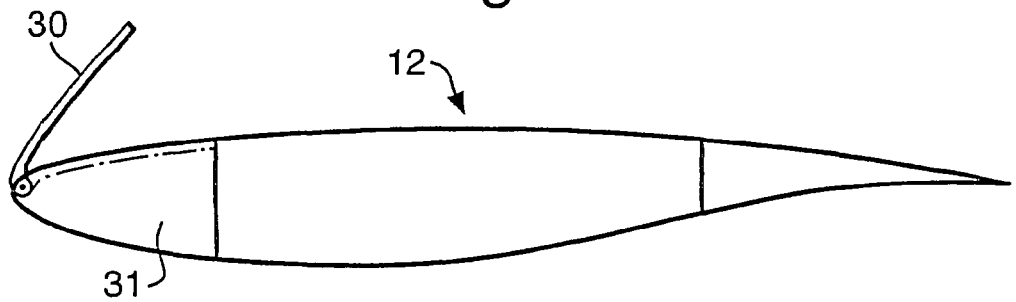

In FIG. 8, an alternative type of leading edge flap 30 is provided in the upper surface of a leading edge section 31 of the wing 10. The flap 30 is movable from a position flush with the leading edge section 31 to the raised position to reduce lift by causing the upper surface flow to separate. Again, flap 30 can be provided in a plurality of leading edge sections.

Figure 9:
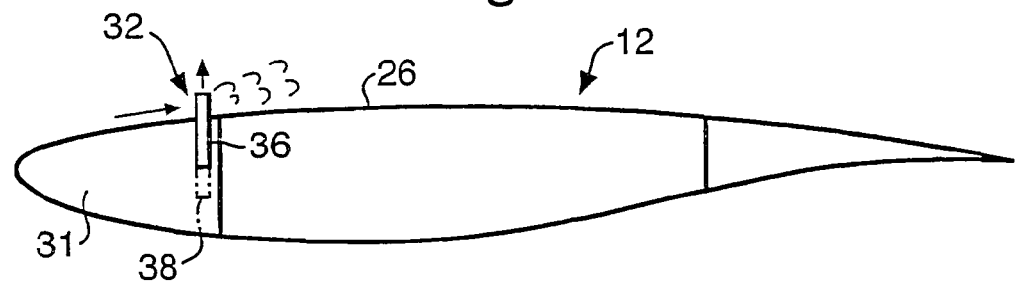

In FIG. 9, a trip device 32 is arranged in one or more leading edge sections 31 and can be deployed from within the winglet envelope so as to project above the upper surface 26 of the winglet. The trip device 32 comprises an elongate plate 36 or series of plates which may or may not be continuous along the winglet span which is moveable in a suitable guide arrangement 38 in the leading edge section 31. On lifting the plate 36 into the position shown in FIG. 9, the flow over the upper surface 26 of the winglet 12 separates downstream of the plate 36 thereby reducing lift on the winglet 12.

Figure 10:
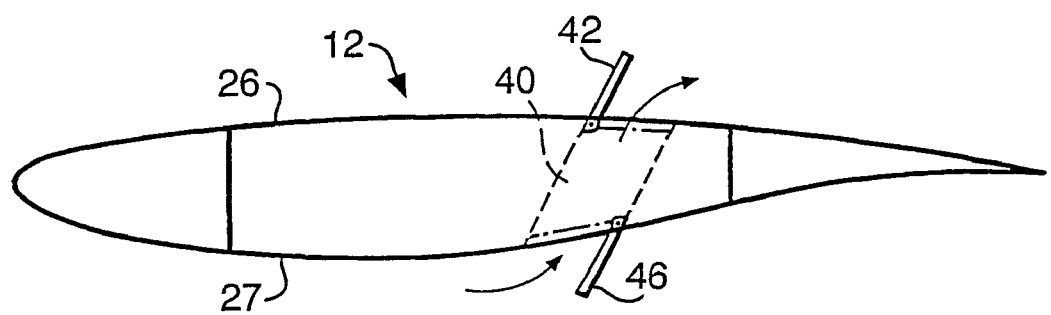

Looking at FIG. 10, a passage 40 is formed in the winglet 12 so as to extend from the lower surface 27 through to the upper surface 26. The passage 40 is openable and closeable by means of upper and lower doors 42, 46 respectively. The door 42 is hinged to the winglet 12 at the forward edge of the passage 40 and the lower door 46 is hinged at the aft edge of the passage 40. The passage 40 extends spanwise along the winglet 12 and, if desired, a plurality of passages may be arranged in respective spanwise sections. With the aircraft in normal level flight, both of the doors 42, 46 lie flush with the respective upper and lower surfaces 26, 27 of the winglet 12. Where a reduction in winglet lift is required, the doors 42, 46 are opened, for example by means of the manoeuvre load alleviation system 22 of the aircraft so as to vent high-pressure air from the lower surface 27 to the upper surface 26 through the passage 40 and thereby reduce lift. The positioning of the door 46 as shown in FIG. 10 encourages a flow of air into the passage 40 and the upper door 42 acts as a spoiler to cause flow separation over the downstream section of the upper surface 26.

Figure 11:
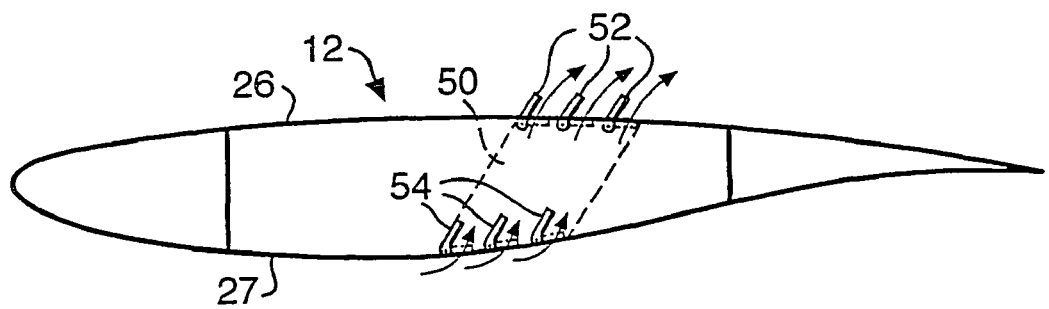

In FIG. 11, a passage 50 is formed in the winglet 12 so as to extend from the lower surface 27 to the upper surface 26. A plurality of doors in the form of pivoted louvres 52 are provided for opening and closing the upper end of the passage 50 and a similar series of pivoted louvres 54 is provided for opening and closing the lower end of the passage 50. In the previous embodiments, the air flow control arrangements are preferably operated by means of the manoeuvre load alleviation system of the aircraft. Whilst the louvres 52, 54 in FIG. 11 could be operated in that way, at a certain critical pressure, for example, when approaching the load limit of a particular manoeuvre, the louvres 52, 54 will be forced open by the air so as to vent high pressure air from the lower surface 27 to the upper surface 26 through the passage 50 thereby reducing lift. In the normal cruise condition these louvres 52, 54 lie flush with the winglet surfaces 26, 27 respectively.

The arrangement shown in FIGS. 5 to 10 could be regarded as "active" control arrangements whereas the embodiment shown in FIG. 11 could be regarded as a "passive" control arrangement adapted to operate automatically at a given pressure. If desired, one or more of the other embodiments could be arranged to deform or deflect somewhat as shown in FIG. 8 at a critical pressure. If desired, the winglet 12 may have a trailing edge section arranged to deform or defect at a critical pressure to reduce lift.

It will be appreciated that the reduction in lift which can be achieved with a winglet in accordance with the invention will reduce the overall lift generated by the wing 10. Whilst the reduction in lift generated by the winglet 12 reduces the bending moment illustrated in FIGS. 2 and 3 particularly during in-flight manoeuvres, the loss of lift at the winglet 12 may need to be compensated for by increasing the angle of incidence of the wing 10. However, such an increase to compensate for the loss at the winglet 12 provides a nett effect whereby the same overall lift will be generated but further inboard along the wing than in the case when the winglet load alleviation system is not activated and hence the overall bending moment on the wing will be reduced.

Where an activated control surface is provided on the winglet, it may be possible to use the control surface for any of the following purposes:
  to help control the wing tip vortex behaviour of the aircraft and hence help minimise the wake vortex characteristics;
  to generate extra lift and/or reduce drag for certain phases of flight (e.g. take-off);
  to provide additional yaw control;
  to provide an air-braking function;
  to help control wing tip stall;
  to optimise flying surface geometry/drag in cruise

The invention claimed is:
1. An aircraft wing including a fixed winglet, said fixed winglet for reducing loads on an aircraft wing during an aircraft maneuver, the fixed winglet comprising:
  manoeuvre load alleviation system for sensing loads on said aircraft; and an air flow control means, responsive to said system for sensing loads, for reducing lift generated by the winglet.

2. An aircraft wing including a fixed winglet, said winglet for reducing loads on an aircraft wing during an aircraft maneuver, the winglet comprising an air flow control means, responsive to the load on an aircraft wing, for reducing lift generated by the winglet.

3. A fixed winglet for an aircraft wing, said winglet for reducing loads on said aircraft wing during an aircraft maneuver, the winglet comprising an air flow control means, responsive to the load on said aircraft wing, for reducing lift generated by the winglet.

4. A winglet according to claim 3 in which the air flow control means is a control surface.

5. A winglet according to claim 4 in which the control surface comprises a trailing edge flap in one or more spanwise sections of the winglet.

6. A winglet according to claim 4 in which the control means comprises a device on a leading edge upper surface which is arranged to cause air flow over an upper surface of the wing to separate to reduce lift.

7. A winglet according to claim 6 in which the device is housed within an envelope of the winglet and is movable into position above the leading edge upper surface to cause the air flow to separate.

8. A winglet according to claim 3 in which the air flow control means is an active control arrangement linked to a control system of the aircraft.

9. A winglet according to claim 3, in which the control means comprises a leading edge flap in one or more spanwise sections of the winglet.

10. A winglet according to claim 3 in which the control means comprises at least one passage formed in the winglet which extends from a lower surface thereof to an upper surface thereof and which can be opened to allow high pressure air at the lower surface to flow upwardly therethrough to the upper surface to reduce lift.

11. A winglet according to claim 10 in which the passage is normally closed by at least one member which serves as a spoiler when the member is moved to open the passage.

12. A winglet according to claim 11 in which one such member is provided for closing the passage at each of the upper and lower surfaces of the winglet.

13. A winglet according to claim 3 in which the control means is a passive control arrangement operable in response to a predetermined condition.

14. A winglet according to claim 13 in which the control surface comprises a movable leading edge or leading edge section which will move in response to the predetermined condition.

15. A winglet according to claim 14 in which the movement of the control surface is effected by deformation of the leading edge or leading edge section.

16. A winglet according to claim 13 in which the control surface comprises a movable trailing edge or trailing edge section arranged to move in response to the predetermined condition.

17. A winglet according to claim 16 in which the movement of the control surface is effected by deformation of the trailing edge or trailing edge section.

18. A winglet according to claim 13 in which the control means comprises a passage formed in the winglet which extends from a lower surface thereof to an upper surface thereof and which is openable in response to the predetermined condition to allow high pressure air at the lower surface to flow upwardly through the passage to the upper surface to reduce lift.

19. A winglet according to claim 18 in which the passage is openable and closeable by means of a cover arrangement at one of the upper and lower surface of the winglet.

20. A winglet according to claim 19 in which the cover arrangement comprises a louvre arrangement.

21. A manoeuvre load alleviation system for an aircraft which includes a winglet according to claim 3.

22. An aircraft wing having thereon a winglet according to claim 3.

23. An aircraft having a wing according to claim 22.

24. A winglet according to claim 3, wherein, during level flight, said winglet is an upturned structure.

* * * * *